June 6, 1961 A. L. FULTON, SR 2,987,325
TRAILER COUPLINGS
Filed Feb. 18, 1960

INVENTOR.
A. L. Fulton, Sr.
BY
Lieber, Lieber & Nilles
ATTORNEYS

2,987,325
TRAILER COUPLINGS
Allen L. Fulton, Sr., Wauwatosa, Wis., assignor to The Fulton Company, West Allis, Wis., a corporation of Wisconsin
Filed Feb. 18, 1960, Ser. No. 9,594
4 Claims. (Cl. 280—512)

This invention relates in general to improvements in vehicle trailer couplings, and it relates more particularly to improvements in the construction and operation of self locking ball and socket trailer couplings of the type having a ball retainer cooperable with a socket member to normally hold the ball member within the socket.

The primary object of the present invention is to provide a simple and durable ball and socket trailer coupling in which the ball is effectively locked within the socket during normal use of the coupling, but may be readily removed whenever detachment of the hauling and trailer vehicles is desired.

It has heretofore been proposed as shown and described in U.S. Patent No. 2,170,980 granted August 29, 1939, to provide a ball and socket trailer coupling embodying a retractable ball retainer pivotally mounted upon the socket member and swingable against the ball member by means of a cam lever coacting with a bearing plate, the lever being pivotally attached to the outer end of a rod extending through the plate and the inner end of which cooperates with the retainer to maintain the ball within the socket. In this patented trailer coupling the cam lever is adapted to be locked to the rod by means of a pad lock in order to prevent unauthorized release of the coupling members; and while the ball retainer is urged into active ball engaging position by a main spring, release of the retainer is effected by gravity and external pressure applied to the cam lever.

A second or auxiliary spring which functioned in opposition to the main spring shown in the patent was later applied between the retainer and the socket member around the rod in this patented type of ball and socket coupling in order to more quickly release the retainer when the cam lever was swung into ball releasing position, and many of the couplings thus modified were placed into successful commercial operation. However, these early modified couplings still required the use of a pad lock in order to positively prevent separation of the ball and socket members, due to vibration or impingement of the cam lever against external obstruction, and various assemblages for positively but releasably latching the ball retainer have more recently been proposed. But most of these recent so-called automatic safety latches were pivotally suspended from the cam lever and coacted with the retainer actuating rod, thereby requiring an additional or special spring in order to cause the safety latch to function properly and also necessitating accurate machining of the rod and latch.

It is therefore an important more specific object of this invention to provide an improved automatic safety latch for the type of ball and socket coupling shown in the above identified patent, which is operable to effectively hold the cam lever in ball retaining position without the addition of such a special latch actuating spring.

Another important object of the present invention is to provide an improved ball and socket coupling embodying a spring released ball retainer swingably suspended from the socket member and operable by a cam lever, and which is provided with an automatic safety latch coacting directly with this lever and is urged into latching position by the same auxiliary spring which serves to release the ball retainer.

A further important object of the invention is to provide a safety latch for such ball and socket couplings, which requires no special formation of the retainer actuating rod and no pivotal suspension of the latch from the cam lever coacting with this rod, and wherein the latch is protectively disposed so that it will not be accidentally released while in locking position.

Still another important object of this invention is to provide an improved vehicle trailer coupling assemblage formed primarily of sheet metal and of relatively few simple but sturdy parts, and which can be manufactured at moderate cost in various sizes and for diverse uses.

These and other more specific objects and advantages of the invention will be apparent from the following detailed description.

A clear conception of the improved structure constituting the present invention, and of the construction and operation of a ball and socket trailer coupling embodying such structure, may be had by referring to the drawing accompanying and forming a part of this specification wherein like reference characters designate the same or similar parts in the various views.

Figure 1:
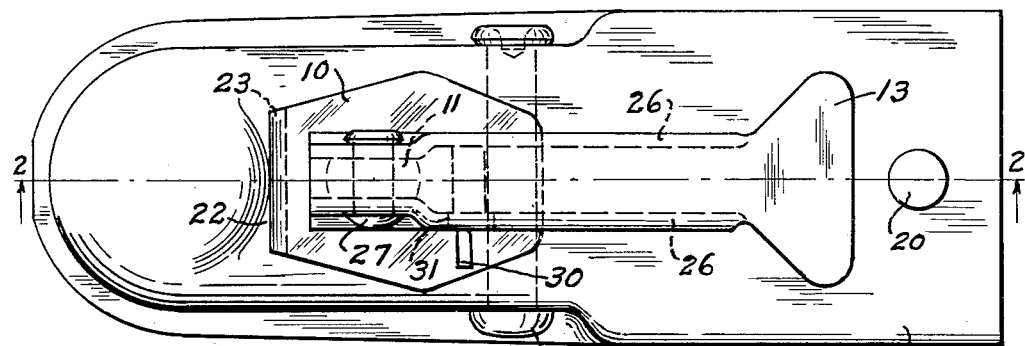
FIG. 1 is a top view of one of the improved ball and socket trailer couplings, fully assembled and showing the locking latch in active or ball confining position.

Although the invention has been disclosed herein as having been embodied in a ball and socket coupling formed primarily of sheet metal and especially adapted for application between the rear bumper of an automobile and the draft tongue of a trailer vehicle, it is not intended to restrict the use of the improvements to such a coupling assemblage; and it is also contemplated that specific descriptive terms employed herein be given the broadest possible interpretation consistent with the disclosure.

Referring to the drawing, the improved ball and socket trailer coupling shown comprises in general, a ball member 6; a socket member 7 having therein a spherical zone surface 8 normally snugly engaging the front and sides of the ball member 6; a ball retainer 9 movably suspended from the socket member 7 and being cooperable with the ball member 6 to hold the latter against the zone surface 8; a bearing plate 10 coacting externally with the socket member 7; a rod 11 penetrating the plate 10 and socket member 7 and having its inner end cooperable with the ball retainer 9 through a relatively heavy main spring 12 to normally hold this retainer in snug engagement with the ball member 6; a cam lever 13 swingably attached to the outer end of the rod 11 and coacting with the plate 10 to move the ball retainer 9 into active position; a latch 14 swingable laterally of the cam lever 13 to alternately lock and release this lever and having a base 15 also penetrated by the rod 11; and a lighter auxiliary spring 16 surrounding the rod 11 and being interposed between the ball retainer 9 and the latch base 15 and operable to release the ball when the lever 13 is swung into inactive position.

The ball member 6, socket member 7, retainer 9, plate 10, lever 13 and latch 14 may all be accurately formed primarily of durable sheet metal with the aid of punches and dies, and the ball member 6 is provided with a rigid bolt and nut assemblage 18 for effecting firm attachment of the ball to a hauling vehicle. The ball engaging end socket of the member 7 is formed integral with an opposite end inverted channel portion 19 which is adapted to be firmly attached to a trailer draft tongue by bolts passed through holes 20, and the depending side walls of the socket member portion 19 are rigidly interconnected by a pivot 21 about which the ball retainer 9 is swingable, see FIG. 2. The side wall connecting web of the channel portion 19 is integrally united with the socketed part of the member 7 by a transverse recess 22 with which an integral stiffening lip 23 on the bearing plate 10 coacts, as shown in FIGS. 1 and 2, and the rod 11 which passes freely through alined openings in the member 7 and plate 10 has its inner end provided with screw threads engaged by an adjustable lock nut 24 against which the heavy spring 12 reacts while holding the spherical zone surface of the retainer 9 against the sphere of the ball member 6.

Figure 2:
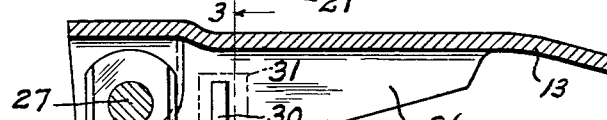
FIG. 2 is a longitudinal vertical approximately central section through the coupling of FIG. 1, taken along the line 2—2 but showing the retainer actuating rod and the cam lever latch in elevation.
Figure 3:
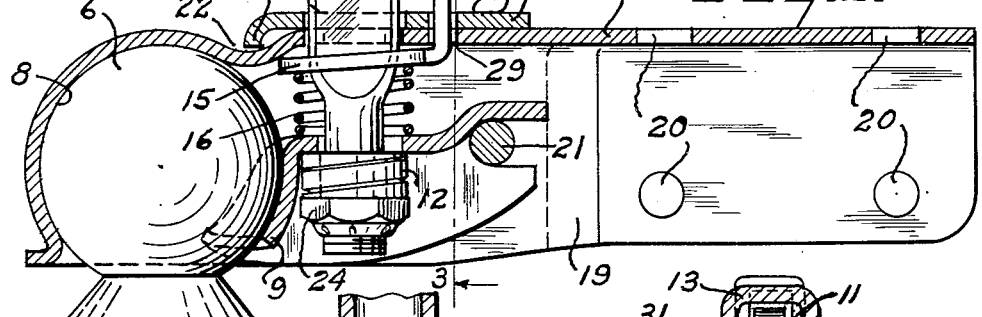
FIG. 3 is a transverse vertical section through the coupling, taken along the line 3—3 of FIG. 2 and showing the automatic latch in ball locking position.
Figure 4:
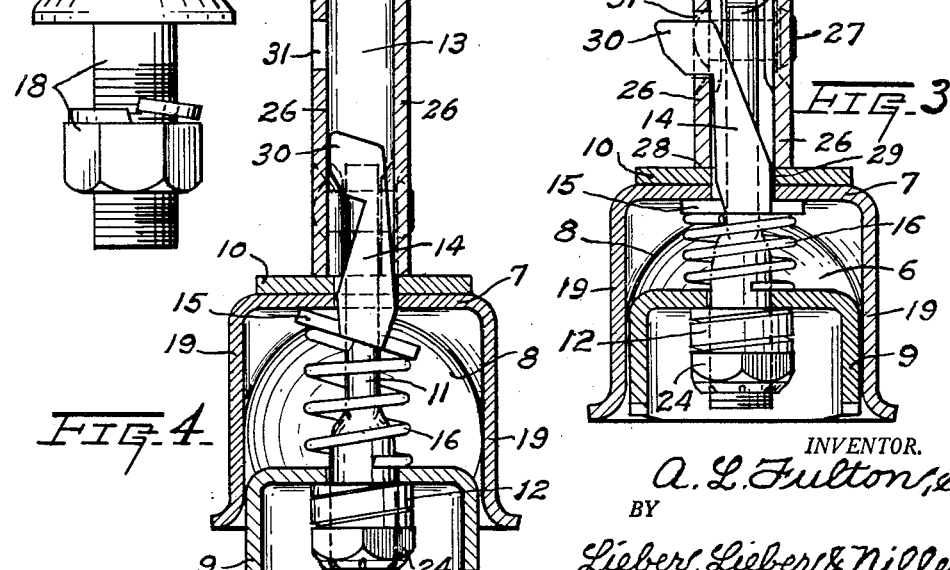
FIG. 4 is a similar but fragmentary transverse section through the same coupling, showing the automatic latch and the cam lever in ball releasing position, the handle of the lever having been broken away.

The outer end portion of the rod 11 is flattened for disposition between the depending opposite side walls 26 of the cam lever 13 and this lever is swingable about a transverse pivot pin 27 passing through the outer end of the flat rod portion, and is provided with cam surfaces 28 formed on the lever walls 26 and which are cooperable with the bearing plate 10 to hold the retainer 9 in ball engaging position, see FIGS. 1, 2 and 3. The socket member 7 and the bearing plate 10 have alined openings 29 therein through which the medial portion of the latch 14 extends, and the outer end portion of this latch is swingable laterally between the side walls 26 of the cam lever 13 and is provided with a holding projection 30 adapted to extend through and to latchingly engage an edge of a hole 31 formed in one of the walls 26, as shown in FIGS. 3 and 4. The base 15 is formed integral with the latch and is provided with a slot through which the flat portion of the rod 11 loosely projects so as to permit the latch 14 to swing laterally, and the auxiliary spring 16 which serves to swing the retainer 9 into ball releasing position when the cam lever 13 is swung into released position, also serves to constantly urge the latch 14 into cam lever holding or locking position by virtue of the direct engagement of this spring 16 with the tiltable latch base 15, see FIGS. 2, 3 and 4.

When the improved ball and socket trailer coupling has been constructed and assembled as above described, and the ball member 6 has been firmly attached to a hauling vehicle while the socket member 7 has been likewise attached to a trailer tongue, the trailer may be quickly and conveniently attached to or detached from the vehicle by merely manipulating the cam lever 13 alone when connecting the members 6, 7, or by manipulating both the latch 14 and the lever 13 when separating the trailer from the motive vehicle. In FIGS. 1, 2 and 3 the coupling has been illustrated in active position as when in normal use, and in this position the sphere of the ball member 6 is snugly confined between the spherical zone surface 8 of the socket member and the opposed spherical zone surface of the retainer 9 by the heavier spring 12. The lateral projection 30 of the latch will then be held firmly within the hole 31 in the adjacent side wall 26 of the lever 13 by the lighter auxiliary spring 16 which coacts with the tiltable latch base 15 as in FIGS. 2 and 3, so that the cam lever 13 will be positively locked against displacement.

In order to thereafter release the coupling, the operator need only press the latch projection 30 out of the hole 31 as in FIG. 4, and to thereafter swing the cam lever 13 in a counterclockwise direction as viewed in FIG. 2, so as to position the handle of this lever 13 approximately perpendicular to the bearing plate 10. During such manipulation of the lever 13, the auxiliary spring 16 will promptly become effective to force the rod 11 inwardly and the retainer 9 away from the sphere of the ball member 6 sufficiently to permit the socket of the member 7 to be lifted freely off of the ball. Then in order to re- establish the connection between the members 6, 7 and with the cam lever 13 still in release position, it is only necessary for the operator to lower the socket of the member 7 over the sphere of the member 6 and to thereafter flip the cam lever 13 in a clockwise position as viewed and shown in FIG. 2, whereupon the latch projection 30 will automatically snap through the hole 31 in the adjacent cam lever wall 26 and will lock this lever 13 into ball retaining position. This automatic functioning of the latch is effected by the same spring 16 which released the retainer 9 and which constantly bears against the latch base 15 as depicted in FIGS. 3 and 4.

From the foregoing detailed description of the construction and operation of the device, it should be apparent that the present invention in fact provides a ball and socket trailer coupling which is simple but durable in construction, and which effectively and automatically locks the coupling members 6, 7 in connected condition while also being readily manipulable to release these members. The improved locking latch 14 besides being located where it is not liable to be accidentally released by external objects, is operable to lock the cam lever 13 in ball locking position by the same spring 16 which serves to release the retainer 9 when the lever 13 is swung into retainer releasing position, and this latch 14 is not pivotally suspended from the lever 13 and does not coact with and require special construction of the rod 11 as in prior devices of this type. While the use of the bearing plate 10 is not absolutely necessary, it is desirable in order to prevent excessive wear on the socket member 7, and this plate 10 is effectively held against displacement by the lip 23 thereby avoiding possible interference with the operation of the latch 14. The major parts of the improved coupling assemblage can be accurately constructed of sheet metal at moderate cost, and the device has proven highly satisfactory in actual use.

Various modes of carrying out the invention are contemplated as being within the scope of the following claims particularly pointing out and distinctly claiming the subject matter which is regarded as the invention.

I claim:

1. A trailer coupling comprising, interconnectable ball and socket members, a retainer suspended from said socket member and being movable to hold said ball member within and to release the same from the socket member, a reciprocable rod having one end connected with said retainer and being movable in one direction to hold said members interconnected while its opposite end extends externally of the members, a cam lever having thereon a cam surface engaging said socket member, a pivot connecting a portion of said cam lever remote from said surface with said opposite rod end, said lever being swingable about said pivot to move said cam surface relative to said socket member and to move said retainer into ball and socket interconnecting position, a helical spring surrounding said rod and being interposed between said socket member and said retainer for moving the rod in the opposite direction into ball releasing position, and a latch having a base interposed between said spring and said socket member and also having a holding projection remote from said base engageable directly with said lever remote from said rod and said pivot, said latch being operable by said spring to lock the cam lever in said member interconnecting position.

2. A trailer coupling comprising, interconnectable ball and socket members, a retainer suspended from said socket member and being movable to hold said ball member within and to release the same from the socket member, a reciprocable rod having one end attached to and connected with said retainer and being movable in one direction to hold said members interconnected while its opposite end extends externally of the members, a cam lever having spaced walls provided with cam surfaces engaging said socket member, a pivot connecting a portion of said lever remote from said surfaces with said opposite rod end, said lever being swingable about said pivot to move said cam surfaces relative to said socket member and to move said retainer into ball and socket interconnecting position, a helical spring surrounding said rod and being interposed between said socket member and said retainer for moving the rod in the opposite direction into ball releasing position, and a latch having a base interposed between said spring and said socket member and also having a holding projection remote from said base engageable directly with one of said lever walls remote from said rod and said pivot, said latch being swingable by said spring to lock the cam lever in said member interconnecting position.

3. A trailer coupling comprising, interconnectable ball and socket members, a retainer suspended from said socket member and being movable to hold said ball member within and to release the same from the socket member, a reciprocable rod having one end connected with said retainer and being movable in one direction to hold said members interconnected while its opposite end is flattened and extends externally through said socket member, a cam lever having thereon spaced walls on opposite sides of said flattened rod end and one of which is provided with a hole while both have cam surfaces engaging said socket member, a pivot connecting a portion of said lever walls remote from hole and from said surfaces with said opposite flattened rod end, said lever being swingable about said pivot to move said cam surfaces relative to said socket member and to move said retainer into ball and socket interconnecting position, a helical spring surrounding said rod and being interposed between said socket member and said retainer for moving the rod in the opposite direction into ball releasing position, and a latch interposed between said walls and having a base interposed between said spring and said socket member and also having an actuating portion projectable through said hole and directly engageable with said lever remote from said rod and said pivot, said lever being operable by said spring to lock the cam lever in said member interconnecting position when said lever actuating portion is within said hole.

4. A trailer coupling comprising, interconnectable ball and socket members, a retainer suspended from said socket member and being movable to hold said ball member within and to release the same from the socket member, said socket member having therein an external recess, a bearing plate having an end projection engaging said recess, a reciprocable rod having one end connected with said retainer to hold said members interconnected while its opposite end extends externally of the members through said bearing plate, a cam lever having thereon a cam surface engaging said bearing plate, a pivot connecting a portion of said lever remote from said surface with said opposite rod end, said lever being swingable about said pivot to move said cam surface along said plate and to move said retainer into ball and socket interconnecting position, a helical spring surrounding said rod and being interposed between said socket member and said retainer for moving the latter into ball releasing position, and a latch having a base at one end interposed between said spring and said socket member in opposition to said plate, said latch being swingable by said spring to lock the cam lever directly to the socket in said member interconnecting position.

References Cited in the file of this patent

UNITED STATES PATENTS

| | | |
|---|---|---|
| 2,726,099 | Nunn | Dec. 6, 1955 |
| 2,824,754 | Bolmes et al. | Feb. 25, 1958 |